March 20, 1928. 1,663,384
G. A. MORRISON
VALVE DEVICE
Original Filed July 3, 1926
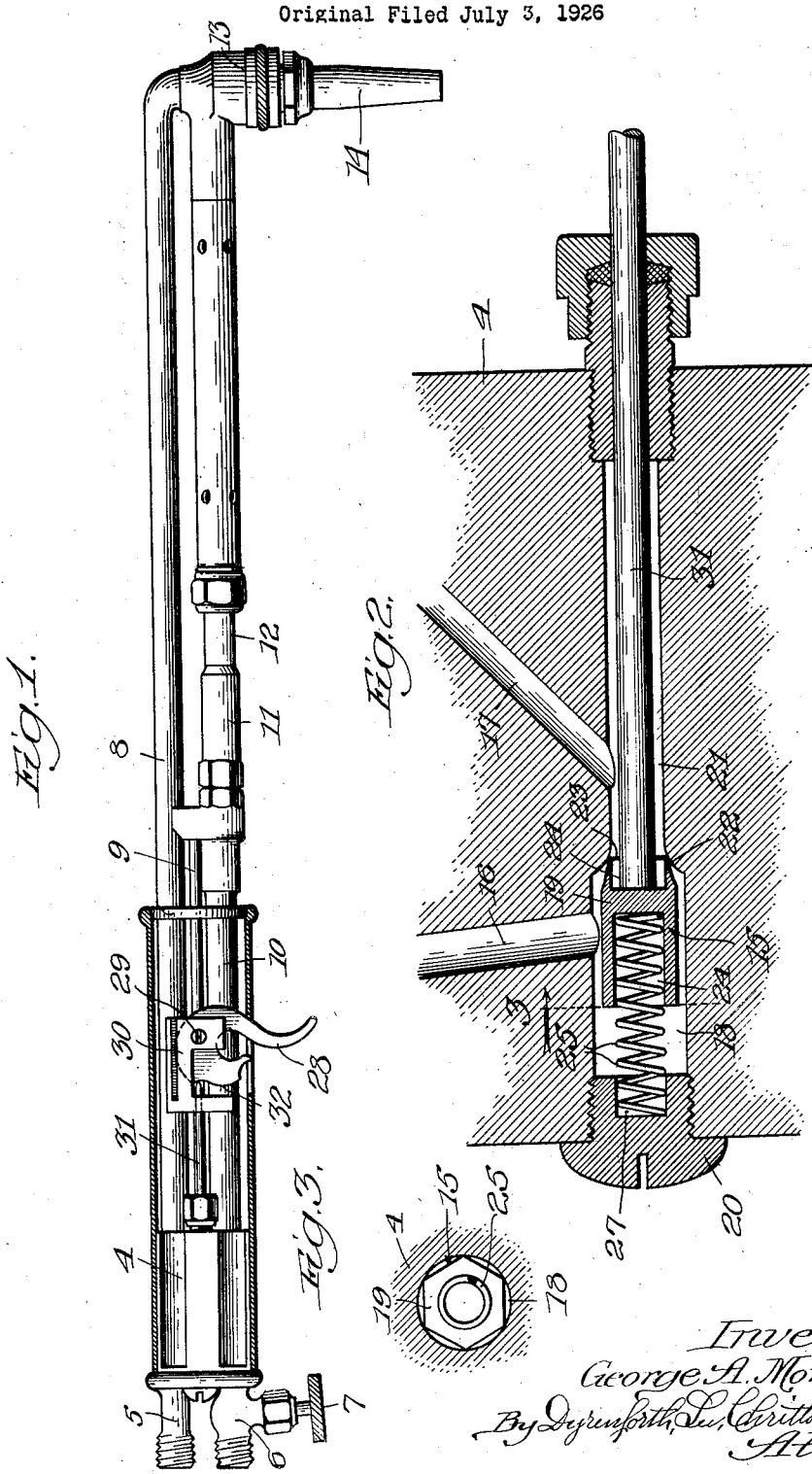

Patented Mar. 20, 1928.

1,663,384

UNITED STATES PATENT OFFICE.

GEORGE A. MORRISON, OF PARK RIDGE, ILLINOIS, ASSIGNOR TO TORCHWELD EQUIPMENT COMPANY, OF CHICAGO, ILLINOIS, A CORPORATION OF DELAWARE.

VALVE DEVICE.

Original application filed July 3, 1926, Serial No. 120,418. Divided and this application filed January 3, 1927. Serial No. 158,709.

My invention relates more particularly, though not exclusively, to valve devices of torches of the so-called oxy-acetylene type and provided to control gas flow therethrough; my primary object being to provide a construction of valve device of the metal-to-metal type, to the end that a tight seat will be afforded, my present application being a division of my application for U. S. patent Serial No. 120,418, filed July 3, 1926.

Referring to the accompanying drawing:—

Figure 1 is a view in side elevation of a cutting torch of the oxy-acetylene type in which my improved valve is incorporated, the handle-forming casing of the torch being shown in section. Fig. 2 is an enlarged broken view in longitudinal section of the valve-equipped body portion of the torch, illustrating details of my improved valve device; and Fig. 3, a broken section taken at the line 3 on Fig. 2 and viewed in the direction of the arrow.

The particular construction of torch shown and which is of the construction shown in my said pending application Serial No. 120,418, is a cutting torch of the oxy-acetylene type comprising a body portion 4 equipped with pipe fittings 5 and 6 for connection, respectively, with supplies of oxygen and acetylene under pressure, the pipe 6 for the acetylene, being provided with a valve 7, as for example of the needle type, for regulating the flow of acetylene therethrough and into the member 4. The body 4 at its forward end connects with pipes 8, 9 and 10, the pipe 8 being for high pressure oxygen supplied through the fitting 5 and controlled by the valve device hereinafter described, the pipe 9 for acetylene and the pipe 10 for low-pressure oxygen supplied from the fitting 5 in a manner not shown because it forms no part of the present invention. The torch also comprises a mixing chamber 11 supplied with oxygen and acetylene from the pipes 9 and 10 and discharging into a pipe 12 which, with the outlet of the pipe 8, opens into a head 13 equipped with a burner tip 14.

My improved valve device is represented generally at 15 and is shown as controlling the flow of oxygen from the fitting 5 to the pipe 8 through passages 16 and 17 in the member 4, the passage 16 communicating at one end with the fitting 5, and the passage 17 at one end with the pipe 8. The other ends of these passages communicate with a recess 18 in the body 4, the walls of which form the casing for the valve proper 19 of the valve-device 15. The recess 18 is closed at one end by a plug 20 and opens, at its other end, into a bore 21 of reduced diameter, through which the passage 17 communicates with the recess 18. Adjacent the juncture of the recess 18 and the bore 21 the end-wall of the recess 18 is shaped to form a valve-seat 22 which is circular in cross-section with its wall flaring outwardly into the recess 18 and of convex form as shown, thereby to provide a convex seat circular in cross-section and flaring toward the valve-proper 19.

The valve 19 at the end thereof at which it engages with the seat 22, when the valve is closed, is formed to provide a relatively thin, flexible, annular portion 23 which, in the seating of the valve against the valve seat, deforms to precisely conform with the portion of the valve seat 22 with which it engages. The shape and proportions of these cooperating parts are such, as shown, that in the initial contacting of the terminal edge of the skirt portion 23, with the convexed valve seat, such engagement will be a circular line contact, and as the valve is crowded against the seat this terminal edge becomes deformed to accurately fit the seat, with a continuing circular line contact between these parts, such line contact being maintained throughout the movement of the valve to seated position, due to the provision of the valve seat as of convexed form.

The portion 23 of the valve may be formed, as shown, by recessing the end of the valve as represented at 24, with its outer surface preferably tapering as shown, the valve being made of any suitable material having such characteristics that it will deform as stated, as for example of bronze.

In order that the gas may pass from the passage 16 into the recess 18, the flow from which latter to the bore 21 is controlled by the valve proper 19, the side wall of the valve is spaced from the wall of the recess 18, as for example by forming the body portion of the valve 19 of hexagonal form as illustrated in Fig. 3, whereby its edge portions formed by the junctures of its angularly disposed sides, guidingly engage the wall of the recess 18.

The valve proper 19 is shown as spring pressed toward the seat with which it cooperates, this spring being represented at 25 and shown as extending into a socket 26 in the valve proper 19 and into a socket 27 in the plug 20.

In the arrangement shown, means are provided for manually controlling the position of the valve proper 19, these means comprising a trigger-like lever 28 pivotally supported at 29 on a bracket 30 secured in fixed relation to the pipes 8 and 10, this lever cooperating with a sliding rod 31 which is slidable in the member 4, engaging at one end with the cam surface 32 of the lever 28 and at its opposite end with the forward end-portion of the valve proper 19, the arrangement of the parts as shown being such that, when the lever 28 is rocked in clockwise direction in Fig. 1, the rod 31 will be shifted to the left and open the valve proper 19 against the action of its spring 25.

The feature of providing the circular, single line contact between the valve proper 19 and the seat 22, as above described, is of great practical importance particularly where the valve is provided for the controlling of gas as in the specific instance illustrated and above described, inasmuch as thereby the seat 22 is rendered self cleaning by the action of the valve proper 19 in moving against it, and the danger of solid particles becoming interposed between interengaging portions of the seat and valve proper, which would impair the proper seating of the valve and scratch or abrade these parts and thereby produce leakage, is avoided.

While I have illustrated and described a particular embodiment of my invention, I do not wish to be understood as intending to limit it thereto, as the same may be variously modified and altered without departing from the spirit of my invention.

What I claim as new and desire to secure by Letters Patent is:

1. In a valve device, the combination of its casing containing an outwardly flaring valve-seat, and a valve having a relatively thin, flexible, annular, end portion at which it bears against the surface of said valve-seat, said seat and valve being so shaped that said valve moves conformingly along said seat with circular hair-line contact therewith.

2. In a valve device, the combination of its casing containing a flaring convexed valve-seat, and a valve having a relatively thin, flexible, annular end portion at which it bears against the convexed surface of said seat with a single, circular line contact.

3. In a valve device, the combination of its casing containing an outwardly flaring valve-seat, and a valve seating in the direction of flow of fluid through said casing and having a relatively thin, flexible, annular, end portion at which it bears against the surface of said valve-seat, said seat and valve being so shaped that said valve moves conformingly along said seat with circular hair-line contact therewith.

4. In a valve device, the combination of its casing containing an outwardly flaring valve-seat, a valve cooperating with said seat, and a spring yieldingly forcing said valve against said seat, said valve having a relatively thin, flexible, annular, end portion at which it bears against the surface of said valve-seat, said seat and valve being so shaped that said valve moves conformingly along said seat with circular hair-line contact therewith.

5. A gas-burning device comprising a member containing a gas-passage provided with a valve-seat, and a valve movable to closed position by the pressure of the gas in said passage and cooperating with said seat and having a relatively thin flexible end portion at which it bears conformingly against said seat.

6. A gas-burning device comprising a member containing a gas-passage provided with an outwardly flaring valve seat, and a valve movable to closed position by the pressure of the gas in said passage and cooperating with said seat and having a relatively thin flexible end portion at which it bears conformingly against said seat.

7. A gas-burning device comprising a member containing a gas-passage provided with a valve-seat, a valve movable to closed position by the pressure of the gas in said passage and cooperating with said seat and having a relatively thin flexible end portion at which it bears conformingly against said seat, and a spring yieldingly forcing said valve against said seat.

8. A gas-burning device comprising a member containing a gas-passage provided with a valve seat, and a valve cooperating with said seat and seating in the direction of, and by, the flow of fluid through said passage and having a relatively thin flexible end portion at which it bears conformingly against said seat.

GEORGE A. MORRISON.